US009649906B2

(12) United States Patent
Myers

(10) Patent No.: US 9,649,906 B2
(45) Date of Patent: May 16, 2017

(54) INFLATION VALVE BRACKET FOR AN AIR SPRING ASSEMBLY ON A VEHICLE

(71) Applicant: Firestone Industrial Products Company, LLC, Indianapolis, IN (US)

(72) Inventor: James R. Myers, Brownsburg, IN (US)

(73) Assignee: Firestone Industrial Products Company, LLC, Indianapolis, IN (US)

( * ) Notice: Subject to any disclaimer, the term of this patent is extended or adjusted under 35 U.S.C. 154(b) by 0 days.

(21) Appl. No.: 15/019,475

(22) Filed: Feb. 9, 2016

(65) Prior Publication Data

US 2016/0159192 A1 Jun. 9, 2016

Related U.S. Application Data

(63) Continuation of application No. PCT/US2014/054282, filed on Sep. 5, 2014.

(60) Provisional application No. 61/875,927, filed on Sep. 10, 2013.

(51) Int. Cl.
| | |
|---|---|
| *B60G 11/26* | (2006.01) |
| *B60G 17/027* | (2006.01) |
| *B60G 11/46* | (2006.01) |
| *B60G 11/27* | (2006.01) |
| *B60G 17/052* | (2006.01) |
| *F16M 13/02* | (2006.01) |

(52) U.S. Cl.
CPC .......... *B60G 17/0275* (2013.01); *B60G 11/27* (2013.01); *B60G 11/465* (2013.01); *B60G 17/0528* (2013.01); *F16M 13/02* (2013.01); *B60G 2204/126* (2013.01); *B60G 2206/911* (2013.01)

(58) Field of Classification Search
CPC .......... B60G 17/0525; B60G 2500/202; Y10T 137/86919
USPC .............................. 280/5.504, 5.514, 124.16
See application file for complete search history.

(56) References Cited

U.S. PATENT DOCUMENTS

| | | | | | |
|---|---|---|---|---|---|
| 3,063,732 | A | * | 11/1962 | Harbers ................. | B60G 5/047 267/32 |
| 4,700,968 | A | * | 10/1987 | Cherry ................... | B62D 61/12 180/290 |
| 5,161,579 | A | | 11/1992 | Anderson, Jr. | |
| 6,012,828 | A | | 1/2000 | Pearce et al. | |
| 6,089,551 | A | * | 7/2000 | Haviland ............. | B60G 17/056 267/64.16 |
| 6,095,744 | A | * | 8/2000 | Harrison ................. | B65F 3/046 294/111 |
| 6,213,489 | B1 | * | 4/2001 | Eckelberry .......... | B62D 53/068 180/209 |

(Continued)

OTHER PUBLICATIONS

International Search Report dated Dec. 12, 2014 for International Application No. PCT/US2014/054282 (2 pages).

*Primary Examiner* — Toan To
(74) *Attorney, Agent, or Firm* — Taylor IP, P.C.

(57) ABSTRACT

A vehicle includes a chassis having a frame member, and a suspension system carried by the chassis. One or more air spring assemblies are associated with the suspension system, with each air spring assembly having an air bag, an air line and an air valve. An inflation valve bracket includes a channel and a flange depending from the channel. The channel is at least partially wrapped around the frame member. The flange has one or more openings with a corresponding air valve in each opening.

13 Claims, 6 Drawing Sheets

(56) References Cited

U.S. PATENT DOCUMENTS

| | | | |
|---|---|---|---|
| 6,679,509 B1* | 1/2004 | Galazin | B60G 9/003 |
| | | | 280/124.116 |
| 6,783,138 B2* | 8/2004 | Reiner | B60G 17/0523 |
| | | | 280/124.16 |
| 7,204,478 B2* | 4/2007 | Plath | F15B 13/0406 |
| | | | 267/64.17 |
| 8,235,403 B2 | 8/2012 | VanDenberg et al. | |
| 2003/0038412 A1* | 2/2003 | Plath | B60G 17/0525 |
| | | | 267/64.16 |
| 2004/0084860 A1* | 5/2004 | Svartz | B60G 9/003 |
| | | | 280/6.159 |
| 2007/0102895 A1 | 5/2007 | Pierce et al. | |
| 2012/0175858 A1* | 7/2012 | Hendriks | B60G 7/02 |
| | | | 280/124.161 |
| 2012/0319366 A1 | 12/2012 | Yagiela | |

\* cited by examiner

US 9,649,906 B2

INFLATION VALVE BRACKET FOR AN AIR SPRING ASSEMBLY ON A VEHICLE

CROSS REFERENCE TO RELATED APPLICATIONS

This is a continuation of PCT application No. PCT/US2014/054282, entitled "INFLATION VALVE BRACKET FOR AN AIR SPRING ASSEMBLY ON A VEHICLE", filed Sep. 5, 2014, which claims priority from U.S. provisional patent application Ser. No. 61/875,927, entitled "INFLATION VALVE BRACKET FOR AN AIR SPRING ASSEMBLY ON A VEHICLE ", filed Sep. 10, 2013, which are incorporated herein by reference.

BACKGROUND OF THE INVENTION

1. Field of the Invention

The present invention relates to vehicle suspension systems, and, more particularly, to air spring helper kits which may be used with suspension systems.

2. Description of the Related Art

Vehicle suspension systems are typically designed and constructed to include a balance of vehicle performance and ride quality or comfort. Depending upon the type and kind of vehicle upon which the suspension system is being used, this balance between performance and ride comfort may be more heavily weighted toward one condition than the other. In most cases, however, typical vehicle suspension systems are relatively well suited for operation under all normal driving conditions. For example, such conditions can include high-speed highway driving as well as traveling along a rough street or road at a relatively low speed.

Performance challenges for such typical suspension systems occur, however, under more extreme conditions. For example, a vehicle having a suspension system that is well balanced for performance and comfort is often not well suited for the very high speeds and accelerations associated with track usage. Similarly, such typical suspension systems are often not well adapted for conditions requiring large suspension travel, such as traversing off-road terrain, for example. Additionally, vehicle suspension systems that are well suited for either of such extreme performance conditions often do not provide a suitable balance of comfort and performance under normal driving conditions.

To overcome these and other issues and difficulties, vehicle suspension systems have been developed that provide balanced performance and ride comfort under normal driving conditions, but which are adaptable for use under conditions in which substantial wheel or axle articulation occurs. However, certain disadvantages exist with such known adaptable vehicle suspension systems, and these disadvantages can act to limit the application and use of such known adaptable vehicle suspension systems.

Air springs, or pneumatic suspension devices, have long been used to isolate road disturbances from a vehicle, seat, or cab. An air spring, as part of a vehicle's suspension can support the vehicle's load or mass at each axle. Typically, each axle of a vehicle associated with an air spring supports the mass component or load carried by the axle. In addition, there may be ancillary air springs that support driver comfort in and around the driver's compartment, or cab. In an air spring, a volume of gas, usually air, is confined within a flexible container. As an air spring is compressed (jounce travel), the pressure of the gas within the air spring increases; and as an air spring extends (rebound travel), the pressure of the gas within the air spring decreases. Road disturbances are mainly absorbed by this compression and extension of the air springs as a function of work ($w=\int F \cdot dx$). Air springs are often engineered to have a specific spring rate or spring constant, thereby controlling jounce and rebound characteristics for the desired application and for comfort.

Air springs as described above typically include air lines which are connected to a corresponding air bag at one end thereof, and connected to an inflation valve at an opposite end thereof. The inflation valves allow more or less air to be selectively placed into the air bags, depending on the anticipated use of the vehicle. An inflation valve bracket in the form of a flat or L-shaped plate is bolted to the chassis at a selected location, and includes one or more holes for receiving the inflation valves therein. It is necessary to either drill through and/or tap the vehicle chassis so that a bolt can be used to attach the inflation valve bracket to the chassis.

What is needed in the art is a simpler and faster way of attaching an inflation valve bracket to the chassis of a vehicle.

SUMMARY OF THE INVENTION

The present invention provides an inflation valve bracket which is easily slid over and attached to a frame member forming part of a hitch frame on a vehicle.

The invention in one form is directed to a vehicle including a chassis having a frame member, and a suspension system carried by the chassis. One or more air spring assemblies are associated with the suspension system, with each air spring assembly having an air bag, an air line and an air valve. An inflation valve bracket includes a channel and a flange depending from the channel. The channel is at least partially wrapped around the frame member. The flange has one or more openings with a corresponding air valve in each opening.

The invention in another form is directed to an inflation valve bracket for use with an air valve of an air spring assembly on a vehicle. The inflation valve bracket includes an open channel and a flange depending from the channel. The flange has at least one opening configured for receiving an air valve therein.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates an embodiment of the invention, in one form, and such exemplification is not to be construed as limiting the scope of the invention in any manner.

DETAILED DESCRIPTION OF THE INVENTION

Figure 1:
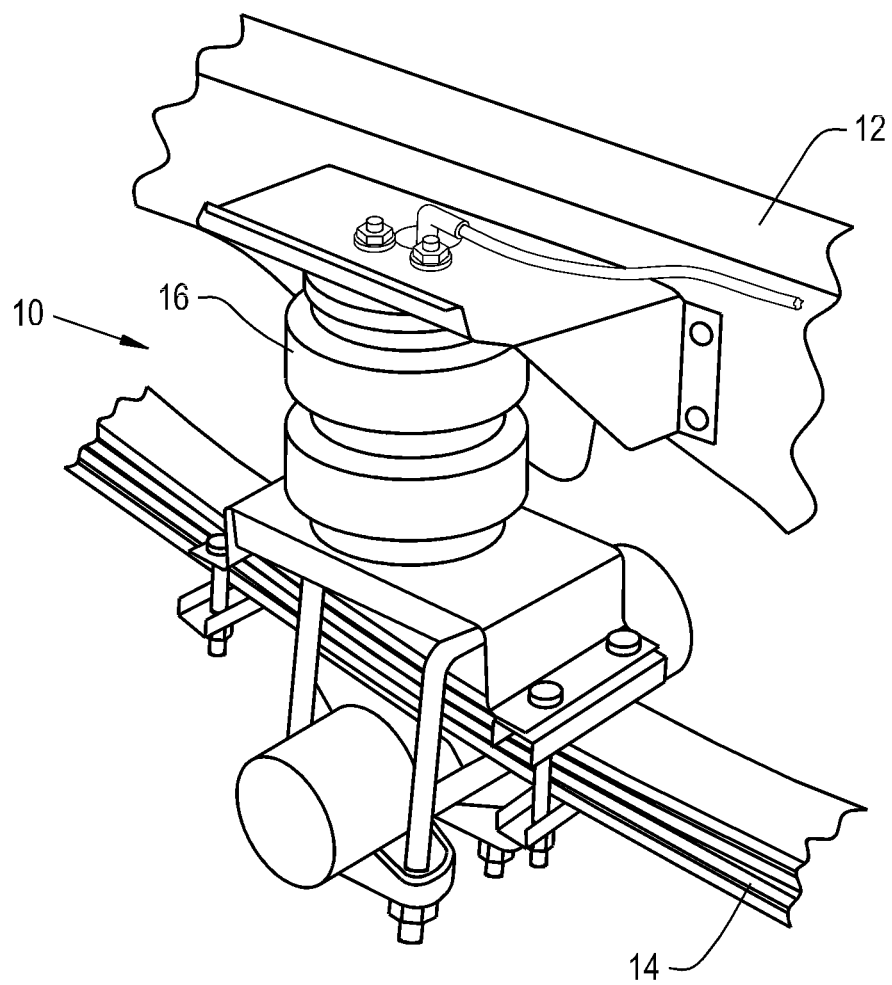
FIGS. 1 and 2 are views of an air spring assembly which may be used with the inflation valve bracket of the present invention.
Figure 2:
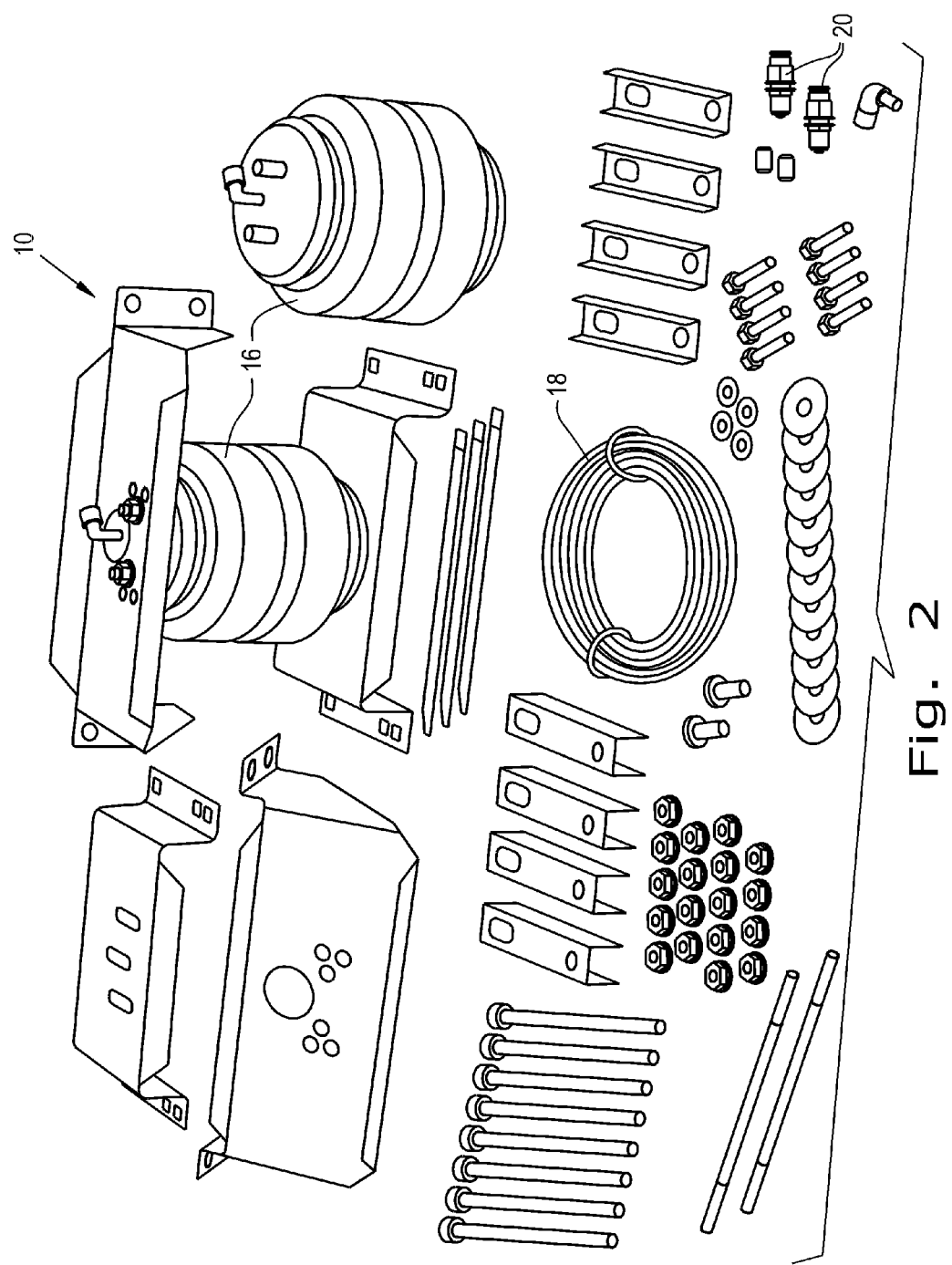

Referring now to the drawings, and more particularly to FIGS. 1 and 2, there is shown part of a vehicle including an air spring assembly 10 which interconnects between a vehicle chassis 12 and suspension system 14. FIG. 1 shows a single air spring assembly 10, and FIG. 2 is an exploded view of two air spring assemblies 10. In the illustrated embodiment, air spring assembly 10 is in the form of a "Ride Rite" air spring helper kit which is manufactured and sold by the assignee of the present invention.

Each air spring assembly 10 generally includes an airbag 16, and air line 18 and an air valve 20. Other miscellaneous parts are also provided, as shown, for interconnecting the air spring assembly 10 between the vehicle chassis 12 and suspension system 14.

Figure 3:
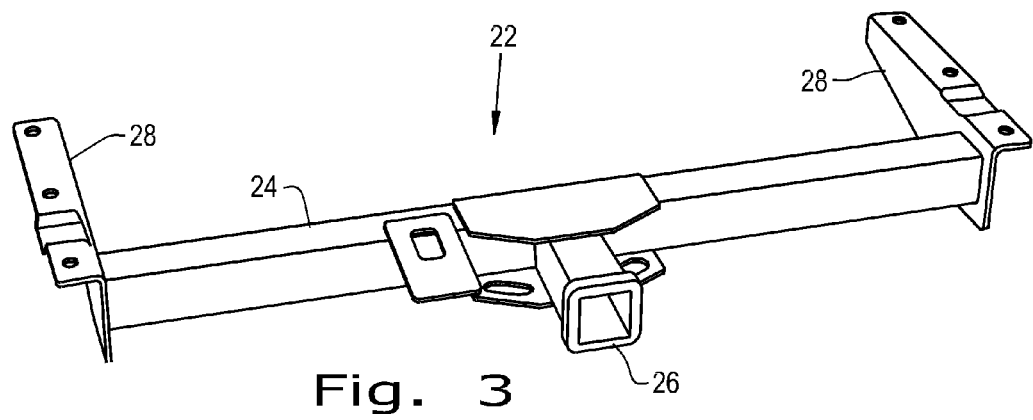
FIG. 3 is a perspective view of a class 4 hitch to which the inflation valve bracket of the present invention can be attached.
Figure 4:
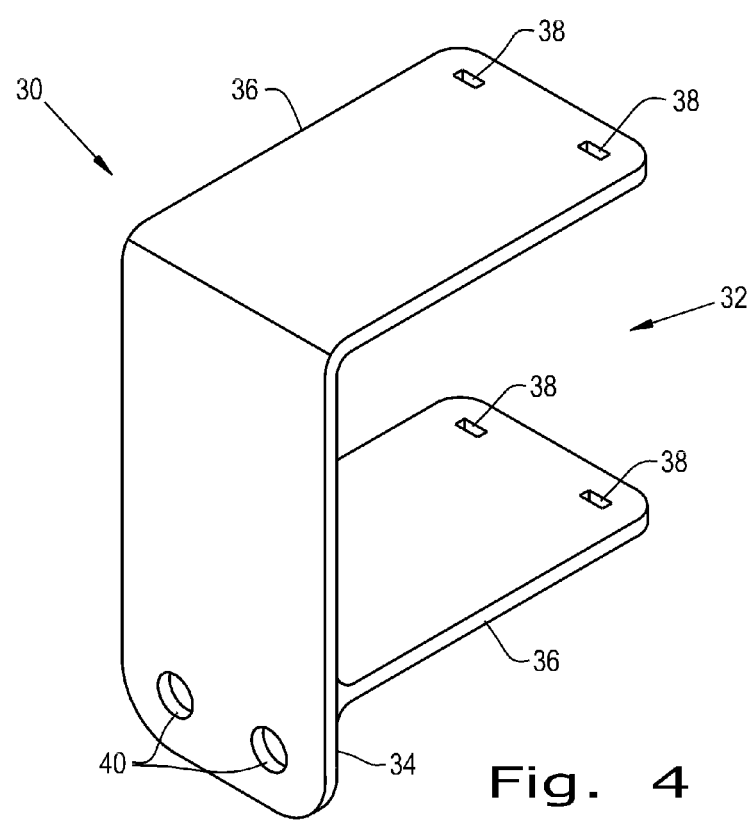
FIGS. 4-7 illustrate an embodiment of the inflation valve bracket of the present invention.
Figure 5:
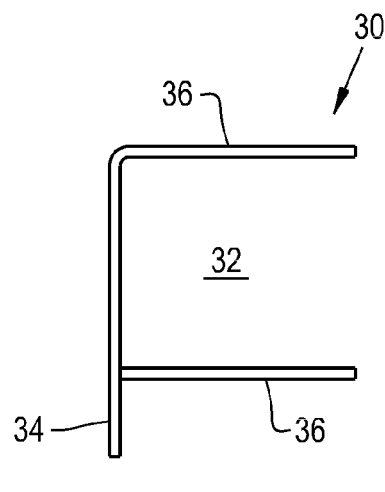
Figure 6:
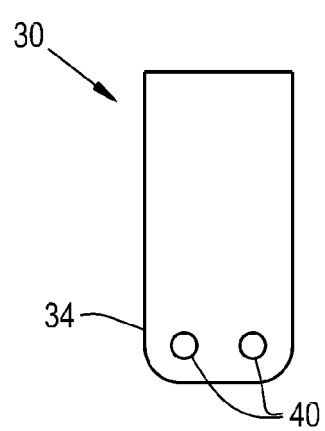
Figure 7:
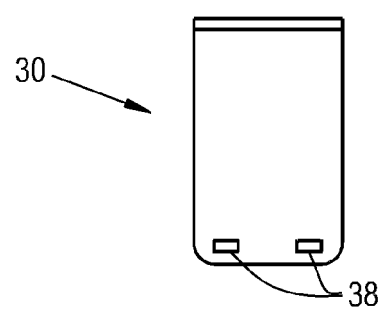
Figure 8:
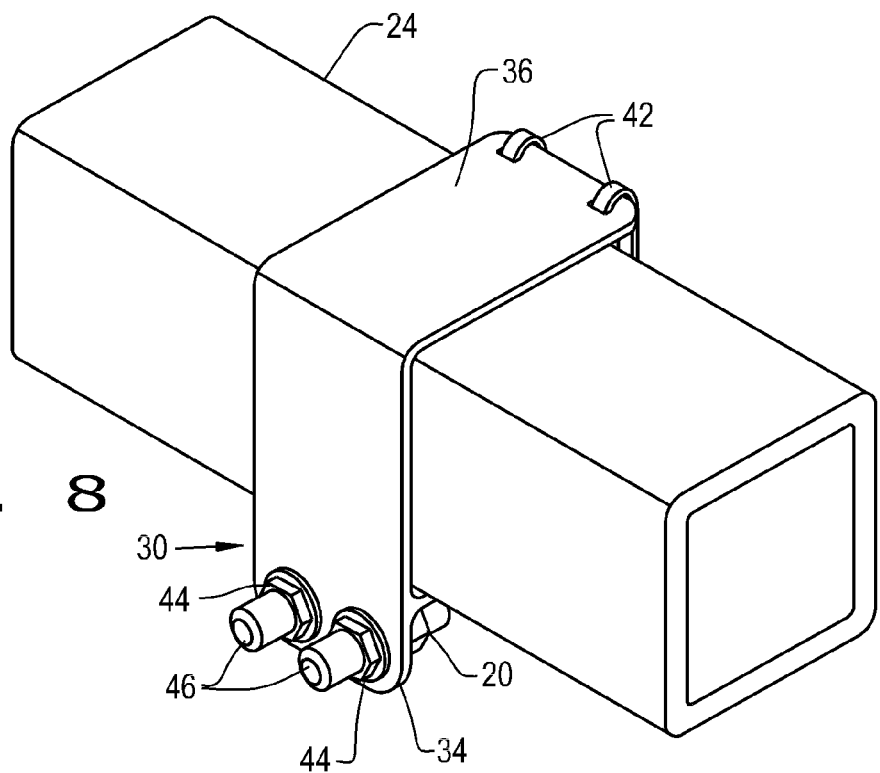
FIGS. 8-12 show the inflation valve bracket of FIGS. 4-7 attached to the hitch shown in FIG. 3.
Figure 9:
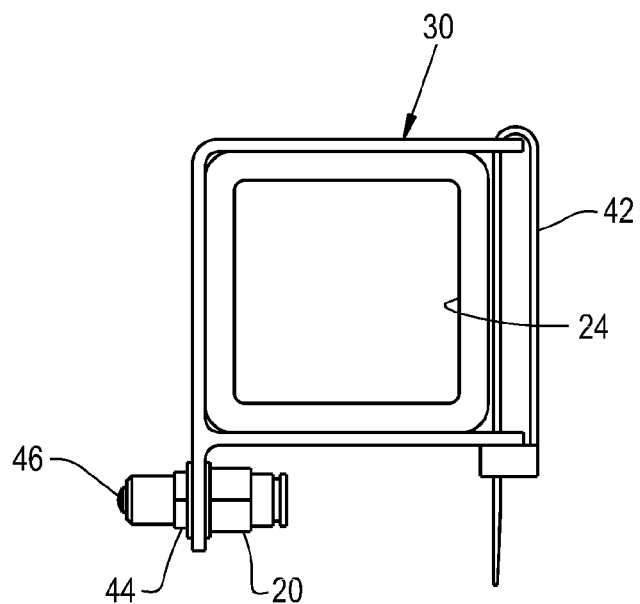
Figure 10:
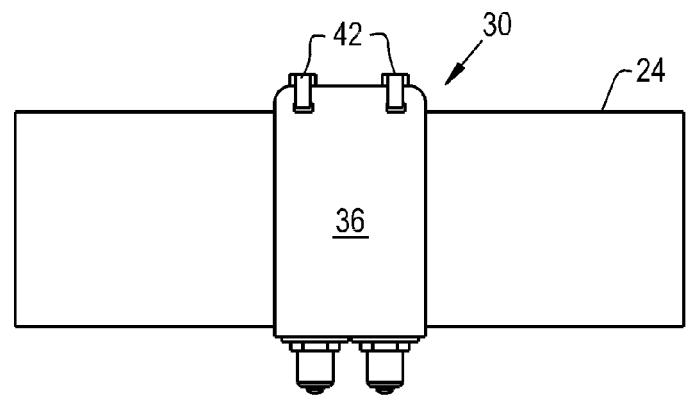
Figure 11:
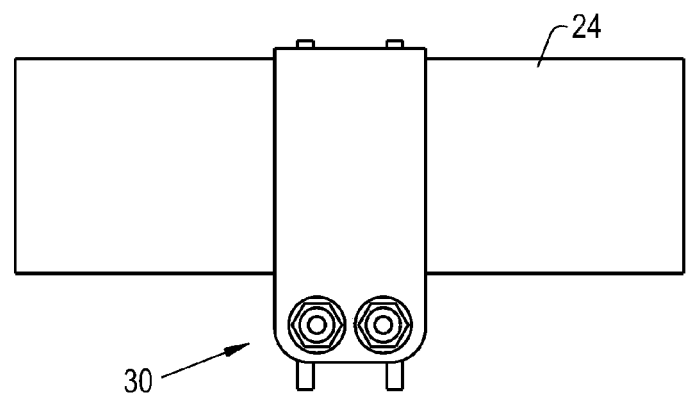
Figure 12:
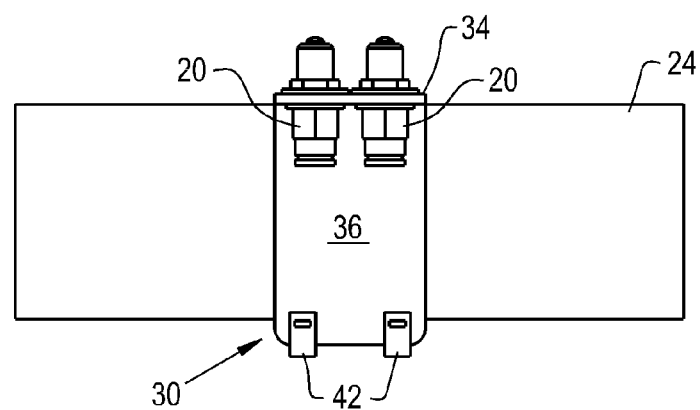

Referring now to FIG. 3, there is shown a hitch frame 22 which is attached to and forms part of the vehicle chassis 12. In the illustrated embodiment, hitch frame 22 is in the form of a class 4 hitch frame, although other types of hitch frames may also be used. Hitch frame 22 includes a frame member 24 with a hitch receiver tube 26 extending rearwardly therefrom. Frame member 24 has a generally square cross-section with a mounting bracket 28 at each end thereof which is attached to the vehicle chassis 12.

According to an aspect of the present invention, and referring to FIGS. 4-7, an inflation valve bracket 30 is easily slid over and attached to frame member 24 of hitch frame 22 (forming part of vehicle chassis 12), and is configured to couple with the air valves 20 shown in FIG. 2. Inflation valve bracket 30 includes an open channel 32 and a flange 34 depending from channel 32. Channel 32 is slid over and wraps around three sides of frame member 24, and flange 34 extends downwardly from channel 32.

More particularly, inflation valve bracket 30 includes two legs 36 which extend transverse to flange 34. The two legs 36 have a length which is sufficient to extend past the frame member 24, and include two pairs of aligned holes 38 for receiving fasteners to attach the inflation valve bracket 30 to frame member 24. In the illustrated embodiment, the two pairs of aligned holes 38 are configured as slots which receive corresponding zip ties 42 (described below) for attaching inflation bracket 30 to frame member 24. However, holes 38 could be differently configured, such as circular holes for receiving bolts.

Flange 34 includes one or more openings 40 which are sized to receive a corresponding air valve 20 therein. In the embodiment shown, flange 34 has two openings 40 for respectively receiving the two air valves 20 shown in FIG. 2.

FIGS. 8-12 show inflation valve bracket 30 attached to frame member 24 of hitch receiver tube 26. Legs 36 are spaced apart a distance corresponding to the height of frame member 24. Inflation valve bracket 30 is simply slid over frame member 24 and two zip ties 42 are inserted through the aligned holes 38 and tightened to attach inflation valve bracket 30 to frame member 24. Legs 36 can be configured to slightly deflect upon tightening of the zip ties 42 so that the inflation valve bracket 30 is tight against and remains at a selected location on frame member 24.

Air valves 20 are then inserted through openings 40 in flange 34. Simple nuts 44 can be used to rigidly secure air valves 20 to flange 34. Caps 46 can be screwed onto the air valves 20, in known manner.

In the embodiment of inflation valve bracket 30 which is shown and described above, the inflation valve bracket is attached to a frame member 24 forming part of hitch frame 22. However, it is to be understood that inflation valve bracket 30 can be sized to slide over other types of frame members forming part of vehicle chassis 12. Inflation valve bracket 30 does not require drilling and/or tapping of the vehicle chassis 12, and is much faster and easier to use than other types of conventional inflation valve brackets.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A vehicle, comprising:
a chassis including a frame member;
a suspension system carried by said chassis;
at least one air spring assembly associated with said suspension system, each said air spring assembly having an air bag, an air line and an air valve; and
an inflation valve bracket including a channel and a flange depending from said channel, said channel being wrapped at least partially around said frame member, said flange having at least one opening with a corresponding said air valve therein, wherein said channel is an open channel and wraps around three sides of said frame member.

2. The vehicle of claim 1, wherein said channel includes two legs extending transverse to said flange and past said frame member, said legs including at least one pair of aligned holes, and further including at least one fastener, each said fastener extending through a corresponding said pair of aligned holes.

3. The vehicle of claim 2, wherein each said fastener is a zip tie.

4. The vehicle of claim 3, wherein said legs include two pairs of aligned holes, and said at least one zip tie is two zip ties.

5. The vehicle of claim 1, including at least one nut to rigidly secure said air valve to the opening in said flange.

6. The vehicle of claim 1, wherein said frame member is part of a hitch frame.

7. The vehicle of claim 6, wherein said hitch frame is a class 4 hitch frame mounted to and forming part of said chassis, and said frame member has a generally square cross section.

8. An inflation valve bracket for use with an air valve of an air spring assembly on a vehicle, said inflation valve bracket comprising:
an open channel and a flange depending from said channel, said flange having at least one opening configured for receiving an air valve therein, said channel including two legs extending transverse to said flange, said legs including at least one pair of aligned holes, and further including at least one fastener, each said fastener extending through a corresponding said pair of aligned holes.

9. The inflation valve bracket of claim 8, wherein each said fastener is a zip tie.

10. The inflation valve bracket of claim 9, wherein said legs include two pairs of aligned holes, and said at least one zip tie is two zip ties.

11. The inflation valve bracket of claim 8, including at least one nut to rigidly secure said air valve to the opening in said flange.

12. A vehicle, comprising:
   a chassis including a frame member, wherein said frame member is part of a hitch frame;
   a suspension system carried by said chassis;
   at least one air spring assembly associated with said suspension system, each said air spring assembly having an air bag, an air line and an air valve; and
   an inflation valve bracket including a channel and a flange depending from said channel, said channel being wrapped at least partially around said frame member, said flange having at least one opening with a corresponding said air valve therein.

13. The vehicle of claim 12, wherein said hitch frame is a class 4 hitch frame mounted to and forming part of said chassis, and said frame member has a generally square cross section.

\* \* \* \* \*